United States Patent [19]  
Choi

[11] Patent Number: 4,713,515  
[45] Date of Patent: Dec. 15, 1987

[54] ELECTRODE HOLDER FOR ELECTRIC DISCHARGE PROCESSING MACHINES

[76] Inventor: Jung W. Choi, 96-3 Saitobuncho, Kanagawa-ku, Yokohama-shi, Kanagawa 221, Japan

[21] Appl. No.: 932,697

[22] PCT Filed: Apr. 11, 1986

[86] PCT No.: PCT/JP86/00179  
§ 371 Date: Nov. 19, 1986  
§ 102(e) Date: Nov. 19, 1986

[87] PCT Pub. No.: WO86/06014  
PCT Pub. Date: Oct. 23, 1986

[30] Foreign Application Priority Data

Apr. 12, 1985 [JP] Japan .................. 60-053662[U]

[51] Int. Cl.⁴ .................................... B23H 7/26  
[52] U.S. Cl. ....................... 219/69 E; 204/286; 204/297 R; 269/137; 269/155  
[58] Field of Search ............ 219/69 E, 69 V, 69 R, 219/138; 204/297 R, 286; 269/137, 155; 82/36 B; 29/40, 41

[56] References Cited

U.S. PATENT DOCUMENTS 2,760,535 8/1956 Mertz .................... 269/137  
3,474,215 10/1969 Johanson ............... 219/69 E  
4,138,100 2/1979 Krummenacher ........ 269/137

FOREIGN PATENT DOCUMENTS 27084 4/1981 European Pat. Off. ......... 219/69 E  
2703332 8/1978 Fed. Rep. of Germany .... 219/69 E  
56-27731 3/1981 Japan .  
140018 9/1983 Japan .

Primary Examiner—A. D. Pellinen  
Assistant Examiner—Geoffrey S. Evans  
Attorney, Agent, or Firm—C. O. Marshall, Jr.

[57] ABSTRACT

An electrode holder clamps the electrode 11 in two perpendicular directions by clamp members 33 and 40. Each clamp member slidably rests on base seat 16 which has side portions 17 and 18 that extend at right angles to each other. Clamp screws 60 and 63 along with serrated engaging faces 48 and 54 and engaging members 47 and 53 allow clamp members 33 and 40 to be positioned finely, thereby accurately positioning the electrode 11. Because the respective clamp faces 37 and 44 of the clamp members 33 and 40 are formed to fit each other, even a small-diameter electrode can easily be clamped into position.

4 Claims, 10 Drawing Figures

ELECTRODE HOLDER FOR ELECTRIC DISCHARGE PROCESSING MACHINES

BACKGROUND OF THE INVENTION

1. Field of the Invention

The present invention relates to an electrode holder for electric spark machine, more particularly to an improved electrode holder for electric spark machine of the type in which the working electrode is clamped from two directions orthogonal to each other.

2. Description of the Prior Art

Generally, the working electrode of an electric spark machine is fixed in position by an electrode holder secured to a fixture which in turn is mounted to the electrode head of the machine.

The conventional electrode holder consists of an L-shaped support block, an L-shaped bent plate, three bolts and other necessary parts. The corresponding ends of said L-shaped support block and bent plate are joined by screws to form a square frame, and the bolts are threadedly passed through said bent plate at its three selected positions, that is, one bolt is passed through a part of one side portion of said L-shaped bent plate, another bolt through a part of the other side portion of said plate and still another bolt through the bend (middle portion) of said plate, in a way that the ends of said bolts project out inside the square frame toward the bend (corner) of the opposing L-shaped support block. The working electrode is positioned at the corner of said support block and said three bolts are tightened so as to hold and clamp the electrode between the corner of said support block and the ends of said three bolts.

According to such conventional electrode holder using bolts as clamping means, however, clamping of the electrode often proves unstable because the abutting portion of each bolt against the electrode is defined to a limited area of the bolt end. Further, when the bolts are tightened, their ends are pressed against the electrode while turning, so that a force is produced which urges the electrode to lift up from its position abutting against the support block. Consequently, the electrode, which should be vertical or horizontal in correct position, tends to incline slightly against the electrode holder when fixed, resulting in a shift from the correct position of the electrode. Therefore, it was necessary to readjust the tightening of the bolts and correct the fixed position of the electrode by using the positioning mechanism of the electrode holder mounting means while observing the correct position with a meter.

Also, the conventional electrode holder had the problem that since the clamping force of the bolts could vary in each electrode fixing operation, the position of the electrode might be shifted each time the electrode is replaced for conducting rough machining or finish machining or for other purposes, making it necessary to make said time-consuming adjustment of the fixed position each time the electrode is set in position, resulting in a reduced working efficiency.

Further, according to the conventional electrode holder, three bolts are threadedly passed through a bent place at its selected positions and the pressing force of the bolts against the electrode acts always in one direction. However, the thickness of the electrode portion to be clamped is widely diversified, and in case the thickness of the electrode portion to be clamped is either excessively large or excessively small, the direction of pressing force of the bolts against the electrode portion clamped would deviate greatly from the center axis of the clamped electrode portion, making it unable to attain stabilized and secure clamping. Especially in case the electrode portion to be clamped is very small in thickness, the ends of the three bolts would hit against each other before reaching the electrode and cannot perform their normal function, so that, in such a case, there has been no alternative but to place a spacer such as a metal plate between the bolt ends and the electrode as a temporary expedient to effect clamping which could prove unstable.

Thus, it was impossible with the prior art to attain correct and secure clamping of all sizes of electrode with a single set of electrode holder, and for accommodating a variety of electrodes, it was necessary to prepare a plurality of electrode holders different in size.

SUMMARY OF THE INVENTION

It is therefore an object of this invention to provide an improved electrode holder for electric spark machine.

It is also an object of this invention to provide an electrode holder for electric spark machine, which holder is capable of correct and quick positioning of the electrode.

It is a further object of this invention to provide an electrode holder for electric spark machine, which holder can adapt itself to correct and secure clamping of electrodes different in thickness.

It is still another object of this invention to provide an electrode holder for electric spark machine, which holder is capable of providing always stabilized clamping of the electrode.

In order to accomplish these objects, there is provided according to this invention an electrode holder for electric spark machine comprising an L-shaped base lock consisting of a first arm and a second arm extending perpendicular to each other, the mutually orthogonal inside faces of said first and second arms being designed to serve as reference plane for abutment against the electrode to be set, each of said first and second arms being provided at its outside face, along a length thereof, with a recession and an elongated slot extending along the central part of said recession, the bottom of said recession being serrated at a constant small pitch to serve as an engaging portion; a first clamping member arranged slidable on the inside face of said first arm of said base block, said clamping member having at its inside end a protuberant portion and cut-out portions (designed to fit with the corresponding portions of the second clamping member described below), said protuberant portion rising up vertically from said reference plane of said first arm of base block so that the end face thereof serves as a plane for abutment against the electrode, said first clamping member being also formed with a hole for passing a clamping screw, said hold extending from an outer end of said clamping member through the central portion thereof and connecting to said elongated slot of said first arm of said base block; a second clamping member arranged slidable on the inside face of said second arm of said base block, said second clamping member having at its inside end a cut-out portion and protuberant portions designed to fit with the corresponding protuberant portion and cut-out portions of said first clamping member, said protuberant portions of said second clamping memer rising up vertically from the reference plane of said second arm of said base block so that their end faces serve as a plane for abutment against the electrode, said second clamping member being also formed with a hole for passing a clamping screw, said hole extending from an outer end of said second clamping member through the central portion thereof and connecting to said elongated slot of said second arm of said base block; a first engaging member having an engaging face serrated at a constant small pitch and designed to engage with the corresponding engaging portion of said first arm of said base block, said first engaging member being arranged freely movable in said recession of said first arm of the base block; a second engaging member having an engaging face serrated at a constant small pitch and designed to engage with the corresponding engaging portion of said second arm of said base block, said second engaging member being arranged freely movable in said recession of said second arm of the base block; a first clamping screw loosely passed through said hole of said first clamping member and through said elongated slot of said first arm of said base block, with the threaded end of said clamping screw being screwed into said first engaging member to secure said first clamping member and said first engaging member to said first arm of said base block; and a second clamping screw loosely passed through said hole of said second clamping member and through said elongated slot of said second arm of said base block, with the threaded end of said second clamping screw being screwed into said second engaging member to secure said second clamping member and said second engaging member to said second arm of said base block.

These and other objects and features of the present invention will become more apparent as the invention is more fully described below in conjunction with the accompanying drawings. It is to be understood, however, that the following description is merely illustrative of the examples of the invention and does not limit the scope of the invention.

DESCRIPTION OF THE PREFERRED EMBODIMENT

The invention will be described hereinafter by way of a preferred embodiment thereof with reference to the accompanying drawings.

Figure 1:
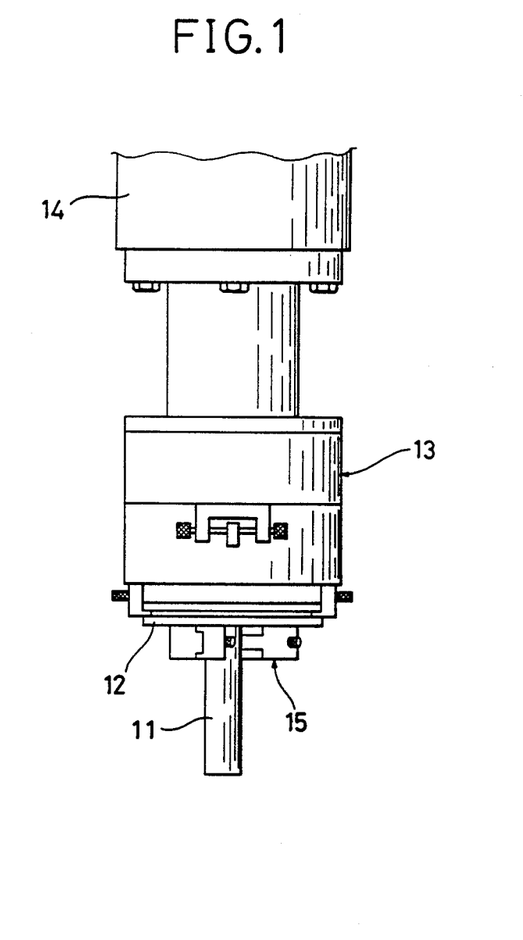
FIG. 1 illustrates a mode of adaptation of an electrode holder according to this invention to an electric spark machine.

Referring first to FIG. 1, there is shown an electrode holder according to this invention as it was adapted to an electric spark machine. It will be seen that the electrode holder 15 clamps a working electrode 11 and is screwed to an adaptor plate 12 which in turn is secured to an electrode holder mounting means 13 attached to electrode head 14 of an electric spark machine.

Electrode holder mounting means 13 incorporates a mechanism for correcting the positional shift of working electrode 11 clamped by electrode holder 15.

Since electrode holder mounting means 13 and adaptor plate 12 are per se known in the art and have no direct relation to the present invention, no detailed description of these elements is given here. It will be noted that FIG. 1 gives a conceptional illustration of the mounting of electrode holder 15 to an electric spark machine according to the present invention.

A typical example of electrode holder 15 according to this invention is described below with reference to FIGS. 2 to 10.

In FIGS. 2 to 7, it will be seen that the electrode holder according to this invention comprises an L-shaped base block 16 consisting of a first arm 17 and a second arm 18 extending prpendicular and continuous to each other. One side 19 of said arms 17, 18 is designed to serve as a fitting plane to which adapter plate 12 shown in FIG. 1 is tightly fitted and secured. The inside faces 20, 21 of said respective arms 17, 18, which faces are orthogonal to each other and vertical to said fitting plane, are designed to serve as reference plane for abutment against electrode 11.

In said one side 19 (serving as fitting plane) of the base block are provided a plurality of tapped holes for screwing adaptor plate 12 to said base block.

Fitting recessions 23, 24 are formed along both edges of inside faces 20, 21 of said first and second arms 17, 18, while seating recessions 27, 28 are formd in the outside faces 25, 26, along a length thereof, of said first and second arms 17, 18, respectively. Along the central part at the bottom of each of said seating recessions 27, 28 is formed an elongated slot (29, 30). Also, the bottom of each of said recessions 27, 28, on both sides of said elongated slot (29, 30), is serrated at a constant small pitch to constitute an engaging portion (31, 32).

Figure 2:
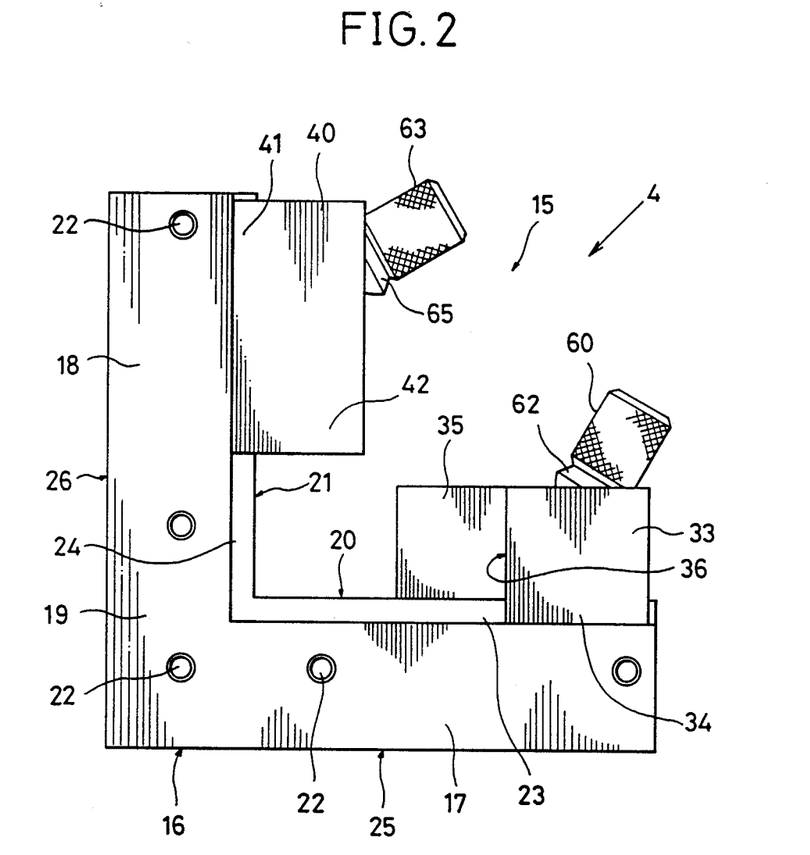
FIG. 2 is a plane view of an embodiment of electrode holder for electric spark machine according to the present invention.
Figure 3:
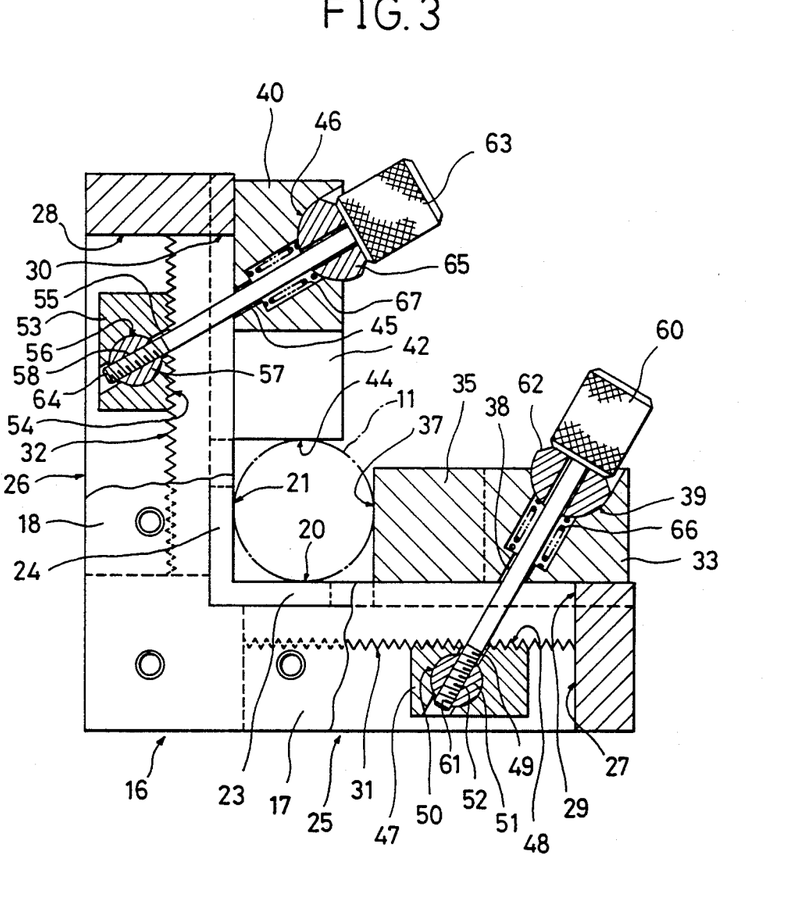
FIG. 3 is a plane view of said electrode holder with parts thereof cut out to show the interior mechanism.
Figure 4:
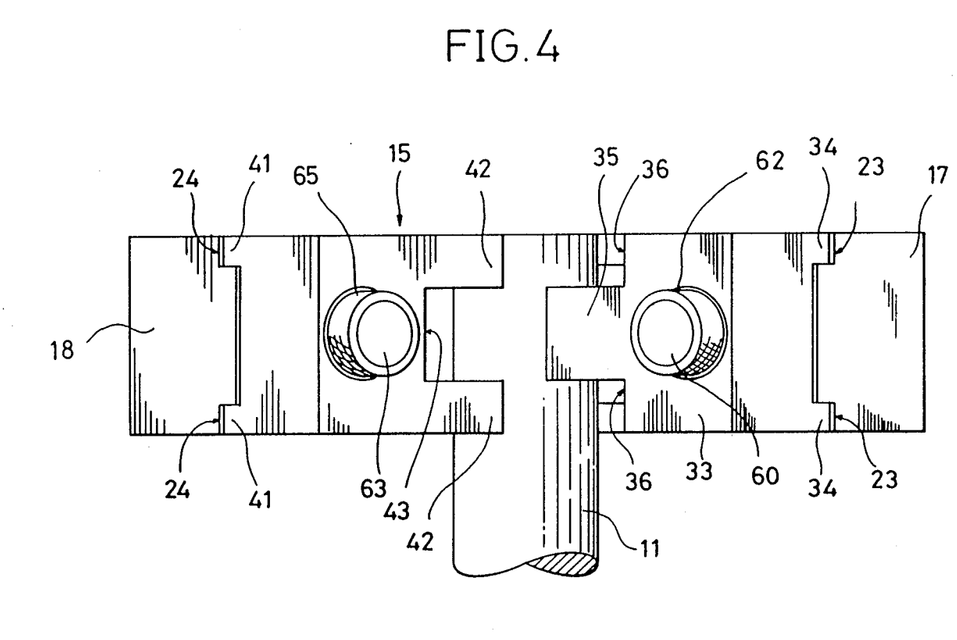
FIG. 4 is a view of said electrode holder as taken in the direction of arrow 4 of FIG. 2, said holder being shown in a state where it has clamped an electrode in position.
Figures 7, 8:
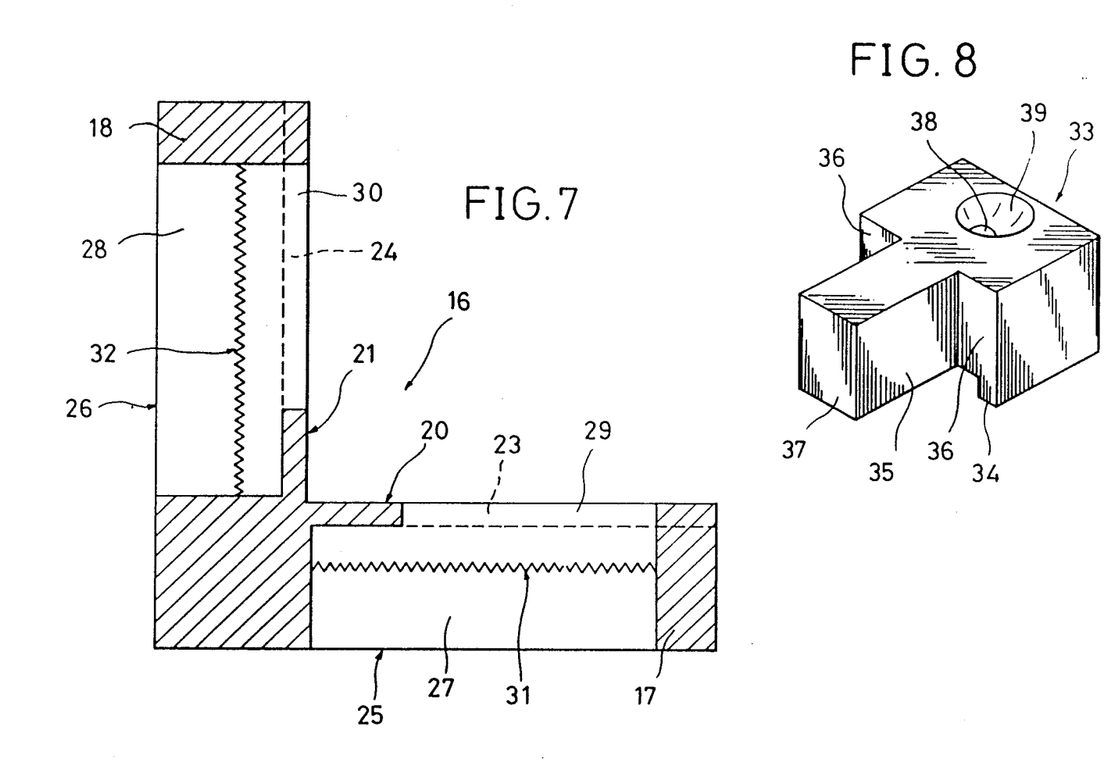
FIG. 7 is a sectional view of said base block as taken along the line 7—7 of FIG. 6.
FIG. 8 is a perspective view of the first clamping member.

As seen in FIGS. 2 to 4 and most clearly in FIG. 8, there is provided a first clamping member 33 which is equal in width to, but smaller in length than, the first arm 17 of base block 16. Both edges of the underside of said first clamping member 33 protrude to form protuberant edges 34, 34 designed to fit in the corresponding recessions 23, 23 formed along both edges of the inside face 20 of first arm 17 of said base block. Through this fitted engagement, said first clamping member 33 is slidable on said inside face 20 of said first arm 17.

At the inside end of said first clamping member 33 are provided a protuberant portion 35 and cut-out portions 36, 36. The end face 37 of said protuberant portion 35 rises up vertically from the inside face 20 of said first arm 17 of said base block 16 to serve as a plane of abutment against electrode 11.

In said first clamping member 33 is also formed a hole 38 for passing a first clamping screw 60 (described below), said hole 38 extending aslant from an outer end of said clamping member through the central portion thereof and connecting to said elongated slot 29 of said first arm 17 of the base block. A spherical seat 39 is formed at the inlet end of said hole 38.

It is to be noted that said hole 38 is large in diameter to a halfway point and reduced in diameter along the rest thereof. The inner diameter of the small-diameter portion of said hole is slightly greater than the outer diameter of the first clamping screw 60 for allowing loose passage thereof through said hole 38.

Figure 9:
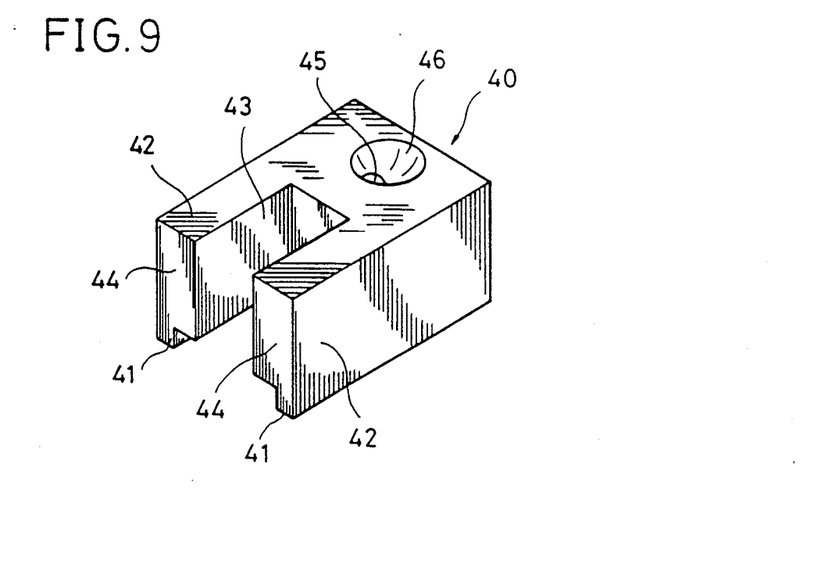
FIG. 9 is a perspective view of the second clamping member.

As seen in FIGS. 2 to 4 and most clearly in FIG. 9, there is also provided a second clamping member 40 which is equal in width to, but smaller in length than, the second arm 18 of said base block 16. Both edges of the underside of said second clamping member 40 protrude to form protuberant edges 41, 41 designed to fit with the corresponding recessions 41, 41 formed along both edges of the inside face 21 of said second arm 18 of the base block. Through this fitted engagement, said second clamping member 40 is slidable on said inside face 21 of said second arm 18.

At the inside end of said second clamping member 40 are formed a cut-out portion 43 and protubertant portions 42, 42 designed to fit with the corresponding protuberant portion 35 and cut-out portions 36, 36 of said first clamping member 33, respectively. The end faces 44, 44 of said protuberant portions 42, 42 rise up vertically from the inside face 21 of said second arm 18 of base block 16 to serve as a plane of abutment against electrode 11.

In said second clamping member 40 is also formed a hole 45 for passing a scond clamping screw 63 (described below), said hole 45 extending aslant from an outer end of said clamping member 40 through the central portion thereof and connecting to said elongated slot 30 of said second arm 18 of base block 16. A spherical seat 46 is formed at the inlet end of said hole 45.

Said hole 45 is large in diameter to a halfway point and reduced in diameter along the rest thereof. The inner diameter of said amall-diameter portion of said hole 45 is slightly greater than the outer diameter of the second clamping screw 63 for allowing loose passage thereof through said hole.

Said base block 16 having said first arm 17 and second arm 18, and said first clamping member 33 and second clamping member 40 constitute the basic structure of electrode holder 15, and these parts are made of a metal material having high mechanical strength and very small in dimensional change with age. An alloyed too steel subjected to a heat treatment is a preferred example of such metal material.

Electrode holder 15 of this invention having the above-described basic structure performs the following functions and effects in coopration of other elements described later.

Firstly, since working electrode 11 is clamped by linearly sliding the first and second clamping members 33, 40 on the inside faces of said first and second arms 17, 18, respectively, of base block 16, the clamping operation can be accomplished quickly. Also, since the abutment of said first and second clamping members 33, 40 against electrode 11 is effected not dynamically as in the conventional bolt clamping system but statically, electrode 11 is not given any force that urges it to lift up from the base block to which it is pressed, so that there is no fear that the electrode 11 be clamped with an inclination.

Further, because of the above-described basic structure of electrode holder 15, as typically illustrated in FIG. 2, electrode 11 is clamped by the clamping forces given from two directions, that is, the clamping force in one direction is given by the combination of inside face 20 (reference plane) of first arm 17 of base block 16 and end faces 44, 44 (abutment plane) of the protuberant portions of second clamping member 40 while the clamping force in other direction is given by the combination of inside face 21 (reference plane) of second arm 18 of base block 16 and end face 35 (abutment plane) of the protuberant portion of first clamping member 33, so that very secure and stabilized clamping of electrode 11 is provided.

Still further, since the contact points of first arm 17 and second clamping member 40 and of second arm 18 and first clamping member 33 with electrode 11 are aligned on the central axis of electrode 11 as shown in FIG. 1, correct and secure clamping of electrode 1 can be realized.

Moreover, since first clamping member 33 is provided at its inside end with protuberant portion 33 and cut-out portions 36, 36 designed to fit with the corresponding cut-out portion 43 and protuberant portions 42, 42 provided at the inside end of second clamping member 40, secure clamping can be achieved even if the portion of electrode 11 to be clamped is small in thickness.

In addition to the above-described structure, electrode holder 15 according to this invention includes the following important elements and arrangements.

Figure 5:
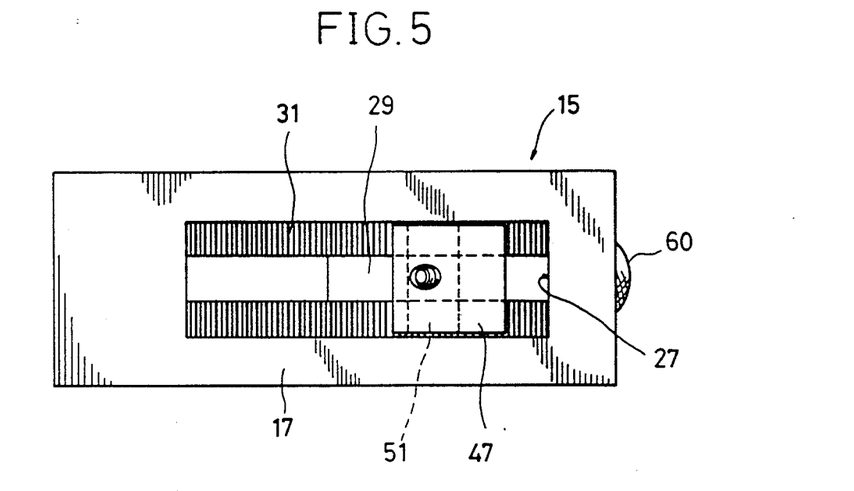
FIG. 5 is a rear view of said electrode holder.
Figure 6:
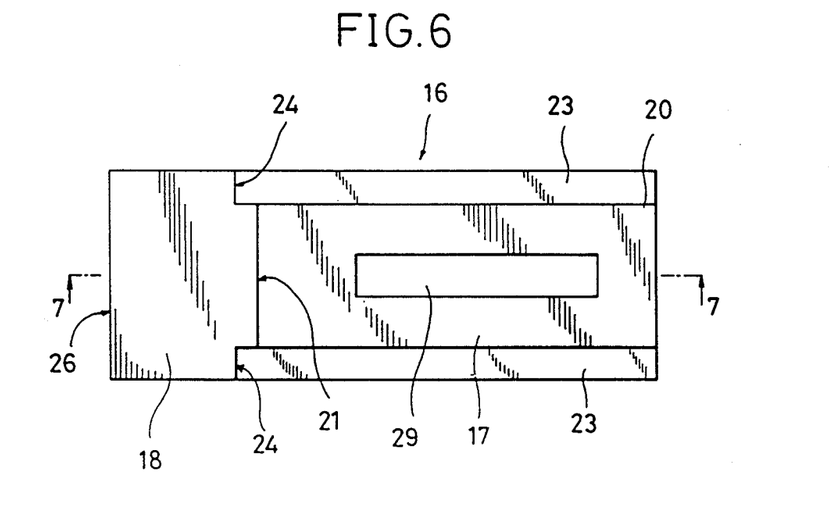
FIG. 6 is a front view of the base block.
Figure 10:
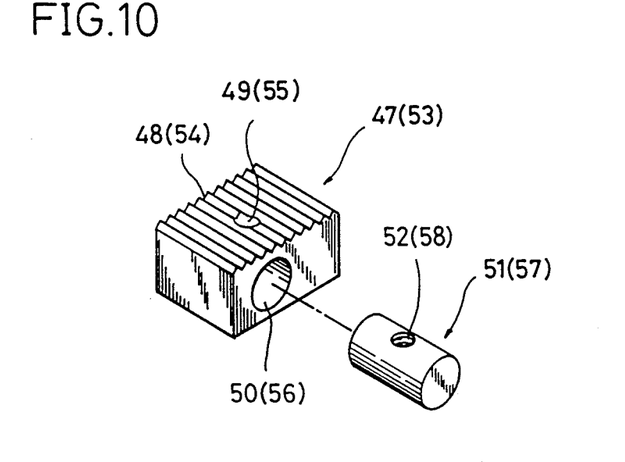
FIG. 10 is a perspective view of the first (or second) engaging member and the first (or second) fixing piece.

As shown in FIGS. 3 and 5 and most clearly in FIG. 10, there is provided a first engaging member 47 having a constant small-pitch serrated engaging face 48 designed to engage with the corresponding serrated engaging face 31 of first arm 17 of base block 16 and disposed movably in recession 27 of said first arm 17. In said first engaging member 47 are formed a hole 49 for loosely passing the first clamping screw 60 described later and another hole 50 extending orthogonally to said hole 49. In said hole 50 is turnably received a first cylindrical fixing piece 51 having a tap hole 52, said fixing piece 51 being placed in said hole 50 at the position where said tap hole 52 is aligned with said hole 49 in said first engaging member 47.

There is also provided a second engaging member 53 which is quite identical with said first engaging member 47. This second engaging member 53 has a constant small-pitch serrated engaging face 54 designed to engage with the corresponding serrated engaging portion 32 of said second arm 18 of base block 16 and disposed movably in said second recession 28 of said second arm 18. In said second engaging member 53 are formed a hole 55 for loosely passing the second clamping screw 63 described later and another hole 56 extending orthogonally to said hole 55. In said hole 56 is turnably received a second cylindrical fixing piece 57 having a tap hole 58, said second fixing piece 57 being placed in said hole 56 at the position where said tap hole 58 is aligned with said hole 55 in said second engaging member 53.

Said first and second engaging members 47, 53 and said first and second fixing pieces 51, 57 are made of the same material as base block 16.

In FIGS. 2 to 7, reference numeral 60 indicates the first clamping screw. This first clamping screw 60 is loosely passed through said hole 38 in said first clamping member 33, elongated slot 29 in said first arm 17 of base block 16 and hole 49 in said first engaging member 47, with the threaded end 61 thereof being screwed into tap hole 52 of said first fixing piece 51. Attached to said screw 60 is a washer 62 formed spherical at its lower portion placed on spherial seat 39 in said first clamping member 33. There is also provided a second clamping screw 63 which is identical with said first clamping screw 60. This second clamping screw 63 is loosely passed through said hole 45 in said second clamping member 40, elongated slot 30 in said second arm 18 of base blcok 16 and hole 55 in said second engaging member 53, with the threaded end 64 thereof being screwed into tap hole 58 of said second fixing pierce 57. Also attached to said second clamping screw 63 is a washer 65 formed spherical at its lower portion placed on spherical seat 46 formed in said second clamping member 40.

Thus, by tightening said first clamping screw 60 into its fixed position, said first clamping member 33 and first engaging member 47 are secured to first arm 17 of base block 16. It will be seen that said first engaging member 47 has the function of positioning said first clamping member 33 on said first arm 17 of base block 16. That is, in a state where said first clamping screw 60 is loosened, said first clamping member 3 is moved on inside face 20 of said first arm 17 while said first engaging member 47 is moved in recession 27 of said first arm 17, and when said first clamping screw 60 is tightened to its fixed position, the engaging face 48 of said first engaging member 7 is engaged with the corresponding engaging portion 31 of said first arm 17 to secure said first engaging member 47 in position in said recession 27, and accordingly said first clamping member 33 is also fixed in position on inside face 20 of said first arm 17. In this case, since both engaging face 48 of said first engaging member 47 and corresponding engaging portion 31 of said first arm 17 are serrated at a constant small pitch, a small pitch of movement can be made in effecting movement of said first clamping member 33. This means that said first clamping member 33 can be fixed at the desired position on said first arm 17 of base block 16 to provide a proper clamping for electrode 11.

Said first clamping screw 60 is so disposed that is runs aslant from the outer end of first clamping member 33 through the central portion thereof. By this arrangement, part of the clamping force of asid first clamping screw 60 becomes a pressing force acting to elecrode 11 from the inner end of said first clamping member 33 to allow clamping of electrode 11. Said first clamping screw 60 is joined at its one end to first engaging member 47 through first turnable fixing piece 51 and also joined at the other end to first clamping member 33 through washer 62 formed spherical at its lower portion and movable on spherical seat 39, with the middle portion of said screw 60 being loosely passed through said first clamping member 33, first arm 17 and first engaging member 47 and hence movable at this portion, too. This arrangement allows microadjustment of movement of first clamping member 33 before perfectly tightening said first clamping screw 60, and thus coupled with the fine positioning function of said first engaging member 47, this arrangement enables continuous positioining and fixing of said first clamping member 33 on inside face 20 of first arm 17 of base block 16 to make sure effective performance of the function of the present improved electrode holder 15.

The same holds true with the mechanism composed of second clamping screw 63, second clamping member 40, second arm 18 and second engaging member 53.

It is to be also noted that a coil spring (66, 67) is loaded between the inside bottom of hole (38, 45) of clamping member (33, 40) and washer (62, 65). These coil springs 66, 67 enable easy tentative fixing of first and second clamping members 33, 40 to first and second arms 17, 18, respectively, by tentatively tightening first and second clamping screws 60, 63.

It is needless to say that various changes and modifications can be made within the scope of the present invention. For instance, the fitting protuberances and cutouts at the inside ends of first and second clamping members 33, 40 may be provided in any suitable number. Also, first and second fixing pieces 51, 57 may not be used, and instead tapped holes may be directly formed in first and second engaging members 47, 53 for screwing thereinto first and second clamping screws 60, 63. In this case, first and second clamping screws 60, 63, except for their end portion, are freely movable relative to the surrounding associated parts, and the microadjustment of movement of first and second clamping members 33, 40 is possible to a fairly high degree. Therefore, the changes and modifications that can be made within the true spirit and scope of the present inention are all embraced in the scope of claims of the invention.

What is claimed is:

1. An electrode holder for electric spark machine comprising:
    an L-shaped base block consisting of a first arm and a second arm extending perpendicular and continuous to each other, the inside faces of said first and second arms serving as reference plane for the abutment againt a working electrode to be set, in which a recession is formed in the outside face, along a length thereof, of each of said first and second arms and an elongated slot is formed along the central part of said recession, the bottom of said recession being serrated at a constant small pitch to constitute an engaging portion;
    a first clamping member arranged slidable on the inside face of said first arm of said base block, said clamping member having a protuberant portion and cut-out portions at the inside end thereof, said protuberant portion rising up vertically from said reference plane of said first arm so that the end face of said protuberant portion serves as a plane of abutment against the electrode, said first clamping member being also formed with a hole for passing a clamping screw, said hole extending aslant from the outer end of said clamping member through the central portion thereof and connecting to said elongated slot of said first arm;
    a second clamping member arranged slidable on the inside face of said second arm of said base block, said second clamping member having at its inside end a cut-out portion and protuberant portions designed to fit with the corresponding protuberant portion and cut-out portions of said first clamping member, said protuberant portions of said second clamping member rising up vertically from said reference plane of said second arm so that the end faces of said protuberant portions serve as a plane of abutment against the electrode, said second clamping member being also formed with a hole for passing a clamping screw, said hole extending aslant from the outer end of said clamping member through the central portion thereof and connecting to said elongated slot of said second arm;

a first engaging member having an engaging face serrated at a constant small pitch and designed to engage with the corresponding engaging portion of said first arm of said base block, said first engaging member being disposed movably in said recession of said first arm;

a second engaging member having an engaging face serrated at a constant small pitch and designed to engage with the corresponding engaging portion of said second arm of said base block, said second engaging member being disposed movably in said recession of said second arm;

a first clamping screw loosely passed through said hole of said first clamping member and through said elongated slot of said first arm of said base block, with the threaded end of said clamping screw being screwed into said first engaging member to secure said first clamping member and said first engaging member to said first arm of said base block; and a second clamping screw loosely passed through said hole of said second clamping member and through said elongated slot of said second arm of said base block, with the threaded end of said clamping screw being screwed into said second engaging member to secure said second clamping member and said second engaging member to said second arm of said base block.

2. The electrode holder for electric spark machine according to claim 1, wherein a spherical seat is formed at the inlet end of the clamping screw passing hole of each of said first and second clamping members, and a washer formed spherical at its lower portion is seated on said spherical seat in abutment against the underside of the head of the corresponding one of said first and second clamping screws.

3. The electrode holder for electric spark machine according to claim 1, wherein said first clamping screw is loosely passed through the hole formed in said first engaging member and is screwed into a first cylindrical fixing piece turnably placed in a hole formed in said first engaging member orthogonally to the first-said hole to thereby fix said first engaging member in position, and the second clamping screw is loosely passed through the hole formed in said second engaging member and is screwed into a second cylindrical fixing piece turnably placed in a hole formed in said second engaging member orthogonally to the first-said hole to thereby fix said second engaging member in position.

4. The electrode holder for electric spark machine according to claim 1, wherein the first clamping screw is screwed into a tapped hole formed in said first engaging member to thereby fix said first engaging member in position, and the second clamping screw is screwed into a tapped hole formed in the second engaging member to thereby fix said second engaging member in position.

* * * * *